(12) United States Patent
Chang

(10) Patent No.: US 9,602,643 B2
(45) Date of Patent: Mar. 21, 2017

(54) COMPOSITE MODULE FOR MOBILE PHONE

(71) Applicants: Sintai Optical (Shenzhen) Co., Ltd., Shenzhen, Guandong Province (CN); Asia Optical International Ltd., Tortola (GB)

(72) Inventor: Hsin-Lung Chang, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

( * ) Notice: Subject to any disclaimer, the term of this patent is extended or adjusted under 35 U.S.C. 154(b) by 116 days.

(21) Appl. No.: 14/535,370

(22) Filed: Nov. 7, 2014

(65) Prior Publication Data

US 2015/0138426 A1 May 21, 2015

(30) Foreign Application Priority Data

Nov. 18, 2013 (TW) .............................. 102141840 A

(51) Int. Cl.
*H04N 5/225* (2006.01)
*H04N 5/232* (2006.01)
(Continued)

(52) U.S. Cl.
CPC ............ *H04M 1/0264* (2013.01); *G03B 3/10* (2013.01); *G03B 15/05* (2013.01); *G03B 17/02* (2013.01);
(Continued)

(58) Field of Classification Search
CPC .. H04N 5/2257; H04N 5/2254; H04N 5/2256; H04N 5/2354; H04N 1/32776; H04N 1/00307; G03B 13/32; G03B 15/05
(Continued)

(56) References Cited

U.S. PATENT DOCUMENTS

2008/0019000 A1\* 1/2008 Lee ...................... G02B 13/001
359/511
2009/0181729 A1\* 7/2009 Griffin, Jr. ........... H04N 5/2254
455/575.1
(Continued)

FOREIGN PATENT DOCUMENTS

| TW | M429296 | 5/2012 |
| TW | M444520 | 1/2013 |
| TW | M456056 | 6/2013 |

*Primary Examiner* — Xi Wang
(74) *Attorney, Agent, or Firm* — McClure, Qualey & Rodack, LLP

(57) ABSTRACT

A composite module includes a macro focus module comprising a second lens and at least one light source near the second lens, wherein the second lens is movable, after the time that the second lens moves to a predetermined location in front of the first lens, the light source illuminates, and after the time that the second lens leaves the predetermined location of the first lens, the light source extinguishes; a power supply module comprising a power supply and a connection interface; and a first circuit board coupled to the power supply, the light source and the connection interface, wherein the power supply is configured to provide power for the light source, and further provide power for the mobile phone through the connection interface which is connected to the mobile phone.

20 Claims, 7 Drawing Sheets

(51) Int. Cl.
   *G02B 15/02*   (2006.01)
   *H04M 1/02*   (2006.01)
   *G03B 15/05*   (2006.01)
   *G03B 3/10*   (2006.01)
   *G03B 17/02*   (2006.01)
   *H04M 1/18*   (2006.01)

(52) U.S. Cl.
   CPC ......... *H04N 5/2252* (2013.01); *H04N 5/2254* (2013.01); *H04N 5/2256* (2013.01); *H04M 1/185* (2013.01)

(58) Field of Classification Search
   USPC ...... 348/207.99, 207.11, 375, 376, 340, 345, 348/374; 455/573; 359/672
   See application file for complete search history.

(56) References Cited

U.S. PATENT DOCUMENTS

| | | | |
|---|---|---|---|
| 2012/0088555 A1* | 4/2012 | Hu | H04B 1/3883 455/573 |
| 2012/0106037 A1* | 5/2012 | Diebel | G06F 1/1628 361/679.01 |
| 2012/0257008 A1* | 10/2012 | Taylor | H04N 5/2252 348/36 |
| 2013/0187609 A1* | 7/2013 | Yen | H02J 7/0016 320/118 |
| 2014/0078594 A1* | 3/2014 | Springer | G02B 7/16 359/672 |

* cited by examiner

COMPOSITE MODULE FOR MOBILE PHONE

BACKGROUND OF THE INVENTION

Field of the Invention

The invention relates to a composite module for a mobile phone, and more particularly to a composite module capable of taking macro shots and severing as a mobile power supply.

Description of the Related Art

In addition to protecting mobile phones, a commercially available mobile phone covers may have other functions.

A conventional mobile phone cover has a movable lens for mobile phones. When a mobile phone is received in the mobile phone cover, the movable lens can be moved to a position in front of a lens of the mobile phone to provide macro focus or telephoto shot effects.

BRIEF SUMMARY OF THE INVENTION

The invention provides a composite module for a mobile phone, capable of taking macro shots and severing as a mobile power supply. The composite module in accordance with an exemplary embodiment of the invention includes a macro focus module comprising a second lens and at least one light source near the second lens, wherein the second lens is movable, after the time that the second lens moves to a predetermined location in front of the first lens, the light source illuminates, and after the time that the second lens leaves the predetermined location of the first lens, the light source extinguishes; a power supply module comprising a power supply and a connection interface; and a first circuit board coupled to the power supply, the light source and the connection interface, wherein the power supply is configured to provide power for the light source, and the power supply further provides power for the mobile phone through the connection interface which is connected to the mobile phone.

The composite module in accordance with another exemplary embodiment of the invention for a mobile phone including a first lens includes a macro focus module includes a second lens and at least one light source near the second lens, wherein the second lens is movable, after the time that the second lens moves to a predetermined location in front of the first lens, the light source illuminates, and after the time that the second lens leaves the predetermined location in front of the first lens, the light source extinguishes; a power supply module comprising a power supply; and a first circuit board coupled to the power supply and the light source, wherein the power supply is configured to provide power for the light source.

The composite module in accordance with another exemplary embodiment of the invention for a mobile phone including a first lens, a light source and a power supply configured to provide power for the light source includes a macro focus module comprising a second lens, wherein the second lens is movable, after the time that the second lens moves to a predetermined location in front of the first lens, the light source illuminates, and after the time that the second lens leaves the predetermined location in front of the first lens, the light source extinguishes.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
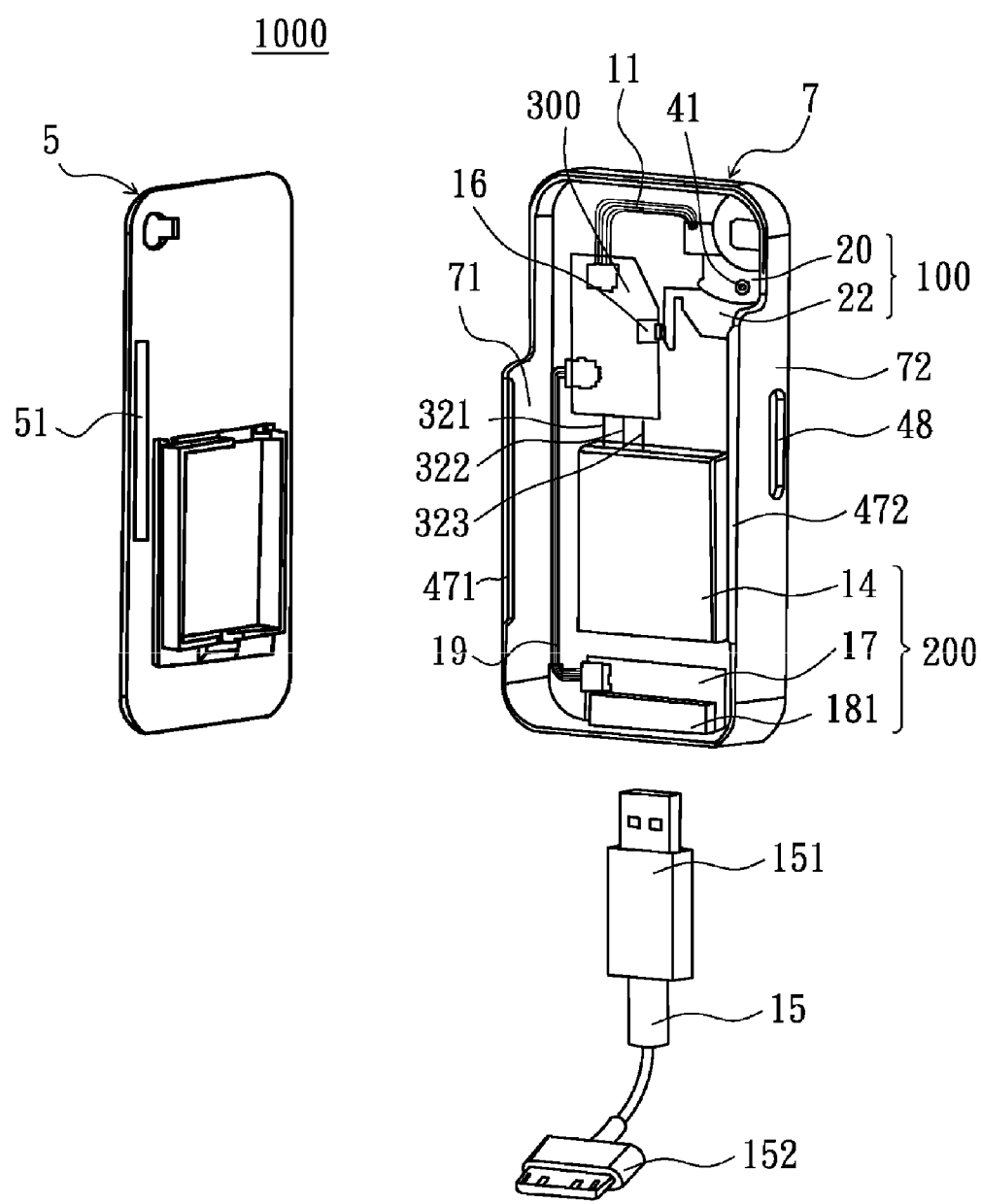
FIG. 1 is a perspective view of an embodiment of a composite module of the invention.
Figure 2:
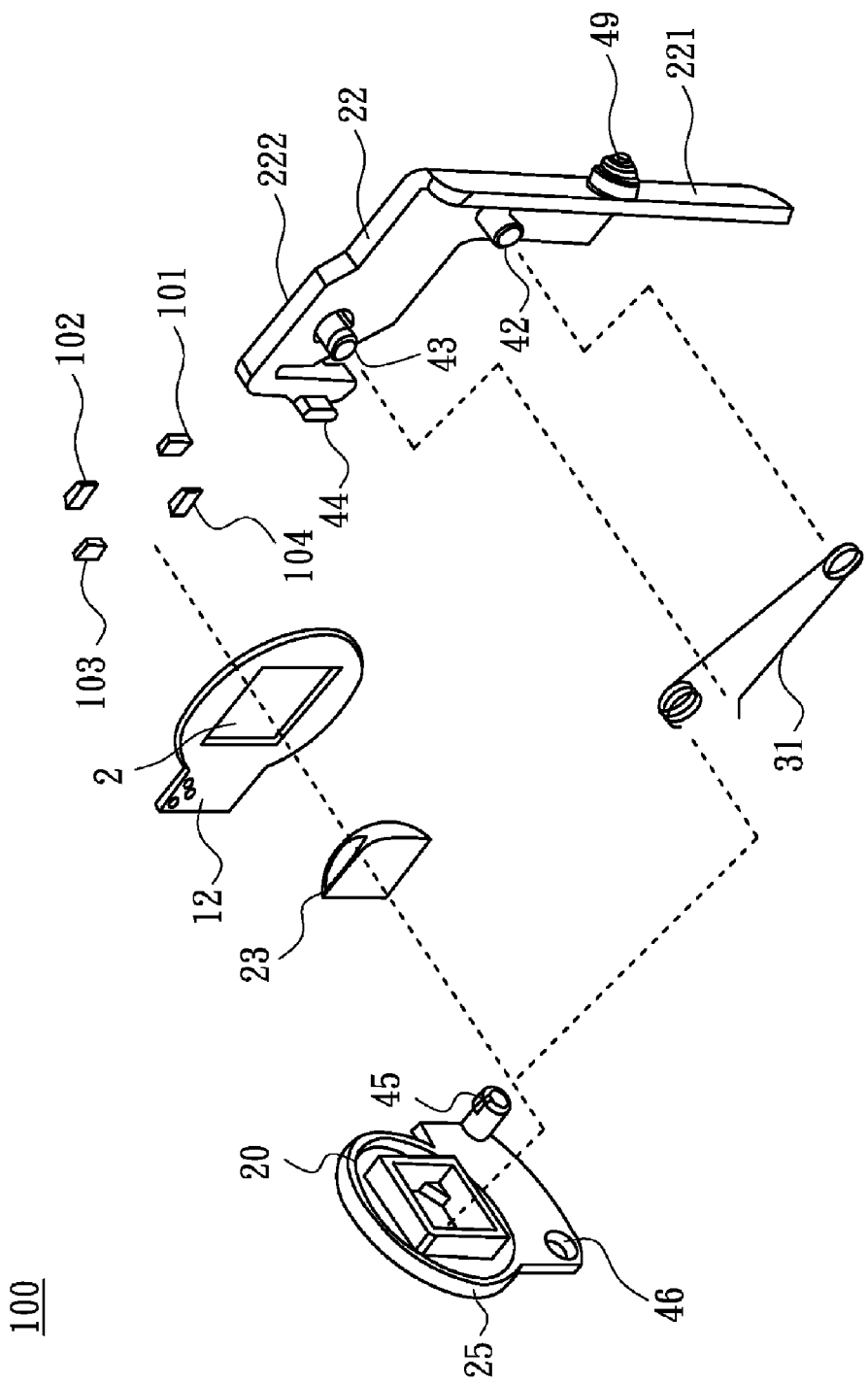
FIG. 2 is a perspective exploded view of a macro focus module of a composite module of the invention.
Figure 3B:
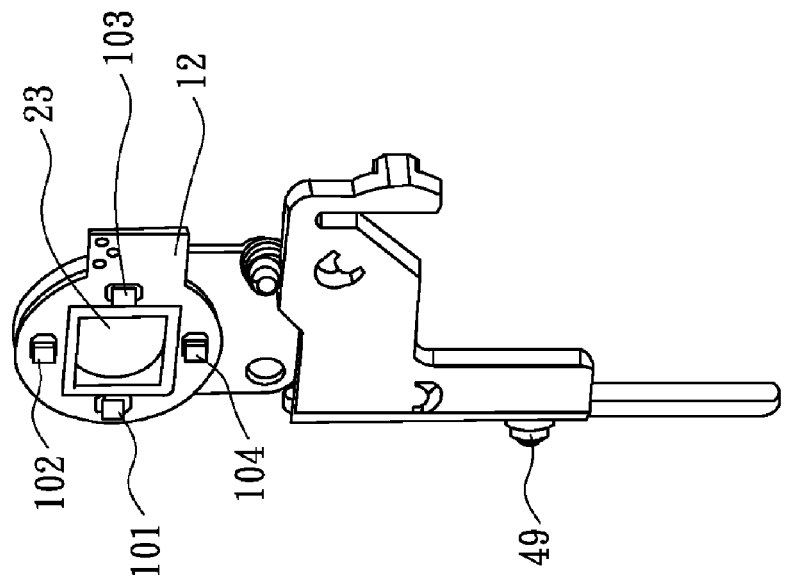
FIG. 3b is another perspective view of a macro focus module of a composite module of the invention.
Figure 3A:
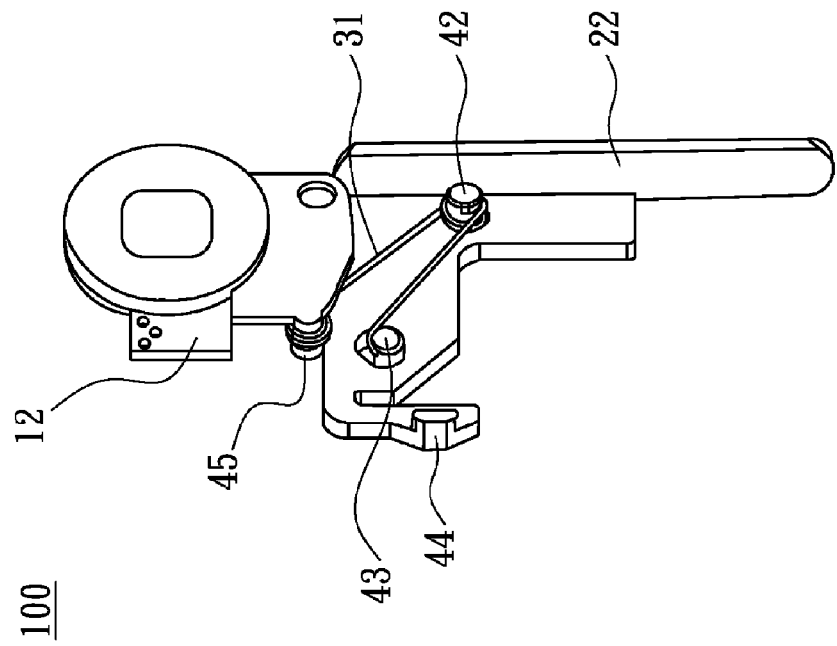
FIG. 3a is a perspective view of a macro focus module of a composite module of the invention.

Referring to FIG. 1, a composite module 1000 includes an upper cover 5, a lower cover 7, a macro focus module 100, a power supply module 200 and a first circuit board 300. The macro focus module 100, the power supply module 200 and the first circuit board 300 are disposed on the lower cover 7. The lower cover 7 has two lateral sides 71 and 72. The lateral side 71 has a clamping arm 471, and the lateral side 72 has a clamping arm 472. The distance between the clamping arms 471 and 472 is slightly longer than the width of a mobile phone. In assembly, the macro focus module 100, the power supply module 200 and the first circuit board 300 are covered by the upper cover 5. The mobile phone (not shown) is placed in a space formed by the lateral sides 71 and 72 and abuts the upper cover 5. The clamping arms 471 and 472 clamps the mobile phone to avoid an accidental separation therebetween.

The first circuit board 300 is connected to the macro focus module 100 and the power supply module 200. The macro focus module 100 enables the mobile phone to take macro shots. The power supply module 200 serves as a mobile power supply for charging the mobile phone.

Referring to FIGS. 1, 2, 3a and 3b, the macro focus module 100 includes a cover 20, a lens (second lens) 23, a second circuit board 12, four light emitting diodes (light source) 101-104, a sliding member 22 and a torsion spring 31. A square frame 25 is disposed on the cover 20, and the lens 23 is mounted in the frame 25. The second circuit board 12 has a square opening 2 fitted to the square frame 25 so as to be positioned in the cover 20. The LEDs 101-104 are disposed on the second circuit board 12, and the second circuit board 12 is electrically connected to the first circuit board 300 through a cable 11. The sliding member 22 is L shaped and has a longitudinal side 221 and a transverse side 222. The longitudinal side 221 engages a path formed by a rib 51 (see FIG. 1) and a lateral side 72 of the lower cover 7. A boss 49 is formed on the longitudinal side 221 and corresponds to a slot opening 48 formed on the lateral side 72 of the lower cover 7. One end of the torsion spring 31 props against a protrusion 43 on the transverse side 222, the central portion of the torsion spring 31 fits to a protrusion 42, and the other end of the torsion spring 31 fits to a protrusion 45 of the cover 20. A hole 46 of the cover 20 is fitted to a shaft 41 (see FIG. 1) of the lower cover 7. A protrusion 44 is disposed on the transverse side of the sliding member 22. The operation of the macro focus module 100 is described as follows.

Figure 4:
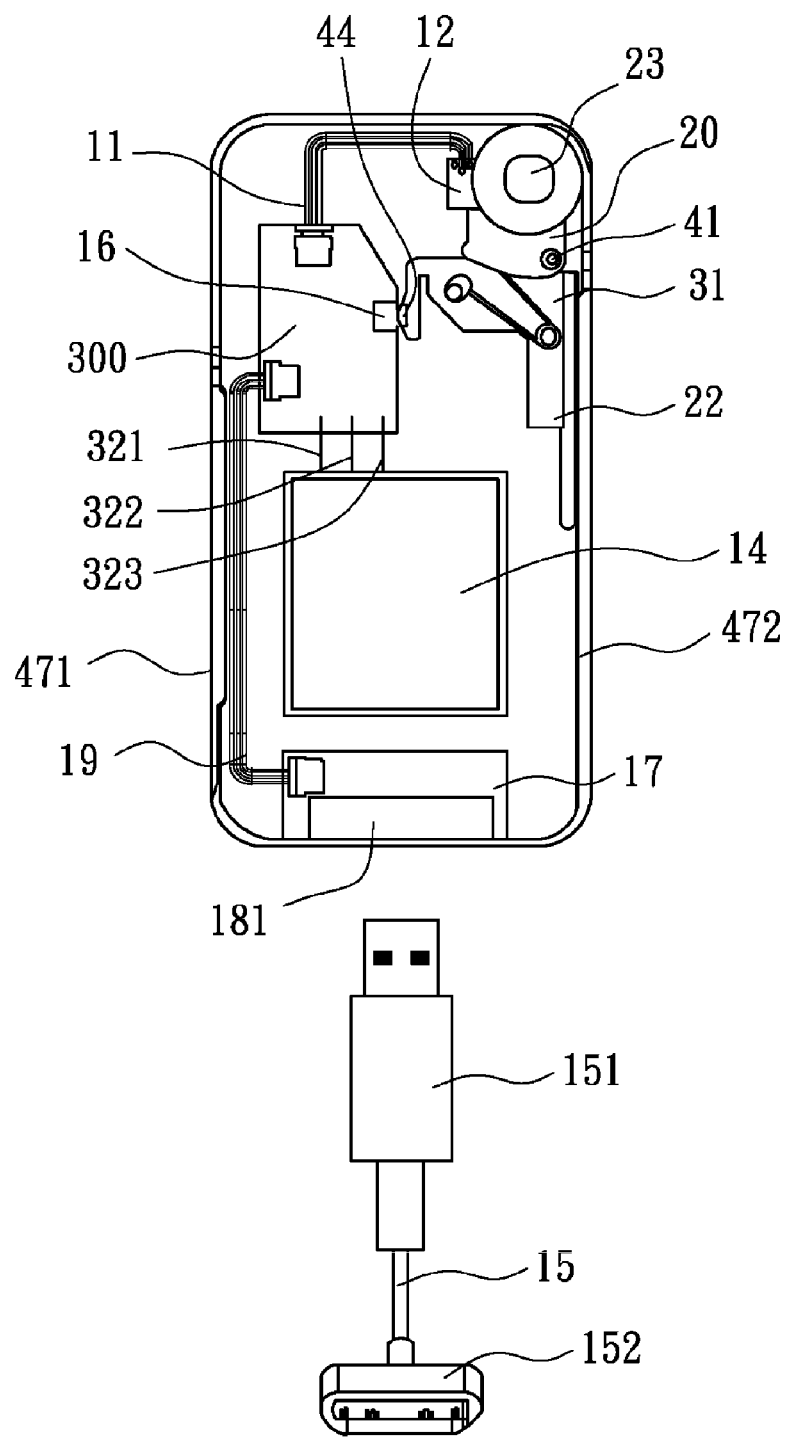
FIGS. 4 and 5 depict motion of a macro focus module of the invention.
Figure 5:
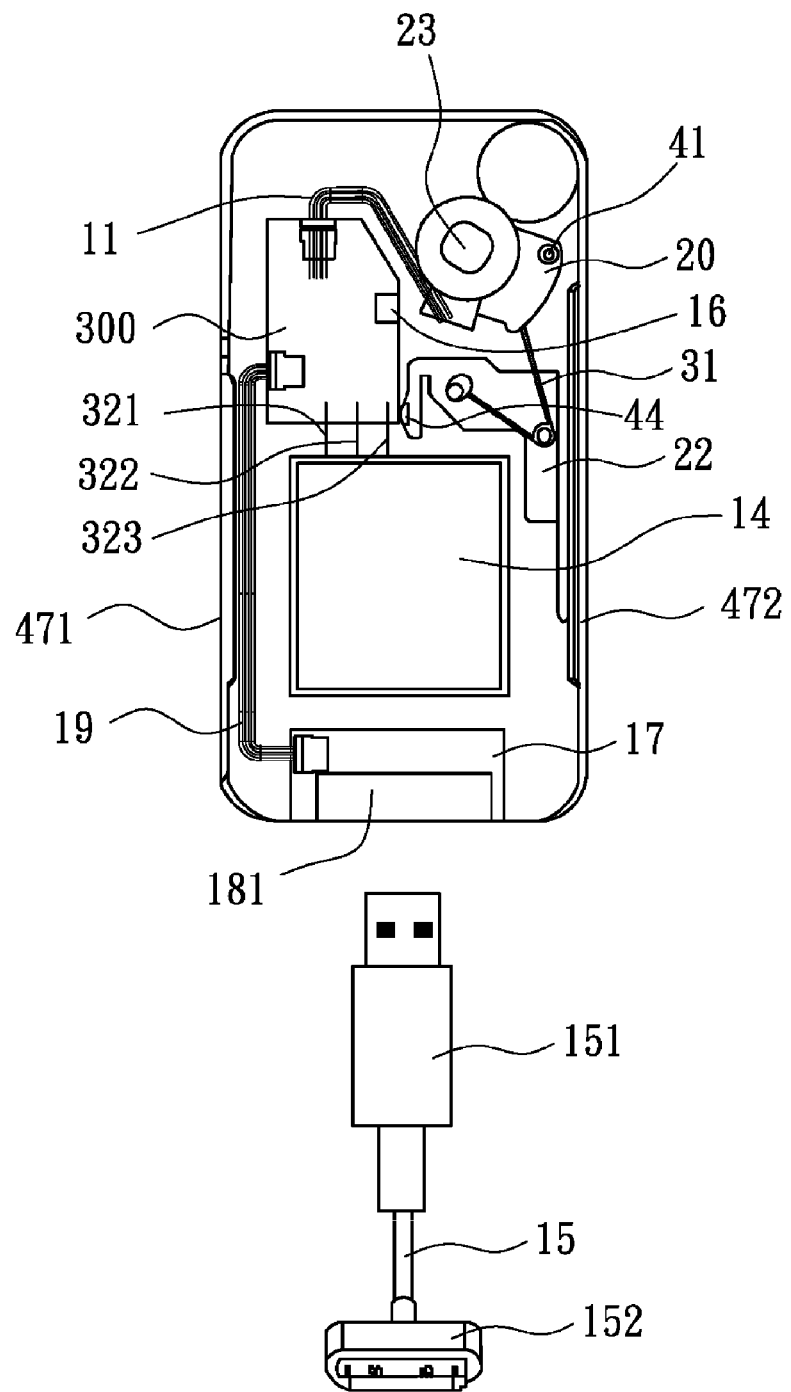

Referring to FIGS. 4 and 5, when the macro focus module 100 is used, the boss 49 is pushed upward to move the sliding member 22 to a first position (see FIG. 4). At this time, the protrusion 44 of the sliding member 22 pushes a switch 16 on the first circuit board 300 to allow power of the lithium battery (power supply) 14 provided for the LEDs 101-104 on the second circuit board 12 through the first circuit board 300 and the cable 11 to switch the LEDs 101-104 on. The cover 20 and the lens 23 rotate to a predetermined location in front of a camera lens (first lens) of the mobile phone so that the mobile phone can take macro shots. When the boss 49 is pushed downward, the sliding member 22 is moved to a second position (as shown in FIG. 5). At this time, the torsion spring 31 drives the sliding member 22 to rotate the cover 20 and the lens 23 about the shaft 41 so that the lens 23 leaves the camera lens of the mobile phone, and the protrusion 44 of the sliding member 22 leaves the switch 16 on the first circuit board 300 to switch the LEDs 101-104 off. Thus, the camera lens of the mobile phone can be used to take photos.

Referring to FIG. 1 again, the power supply module 200 includes a lithium battery 14, a USB connector (connection interface) 181 and a third circuit board 17. The lithium battery 14 is electrically connected to the first circuit board 300 by springs 321, 322 and 323. The first circuit board 300 is electrically connected to the third circuit board 17 by a cable 19. The USB connector 181 is disposed on the third circuit board 17. An external cable 15 connects the USB connector 181 and the mobile phone with an end 151 connected to the USB connector 181 and the other end 152 connected to the mobile phone. Thus, the lithium battery 14 is able to provide power for the mobile phone through the first circuit board 300, the cable 19, the third circuit board 17 and USB connector 181.

A first control chip (not shown) is disposed on the third circuit board 17. The first control chip functions to compare a voltage of the lithium battery 14 and a voltage of the mobile phone. When the voltage of the mobile phone is smaller than the voltage of the lithium battery 14, the first control chip is switched on, and the lithium battery 14 is able to provide power for the mobile phone. When the voltage of the mobile phone is greater than the voltage of the lithium battery 14, the first control chip is switched off to prevent the mobile phone from charging the lithium battery 14.

Figure 6:
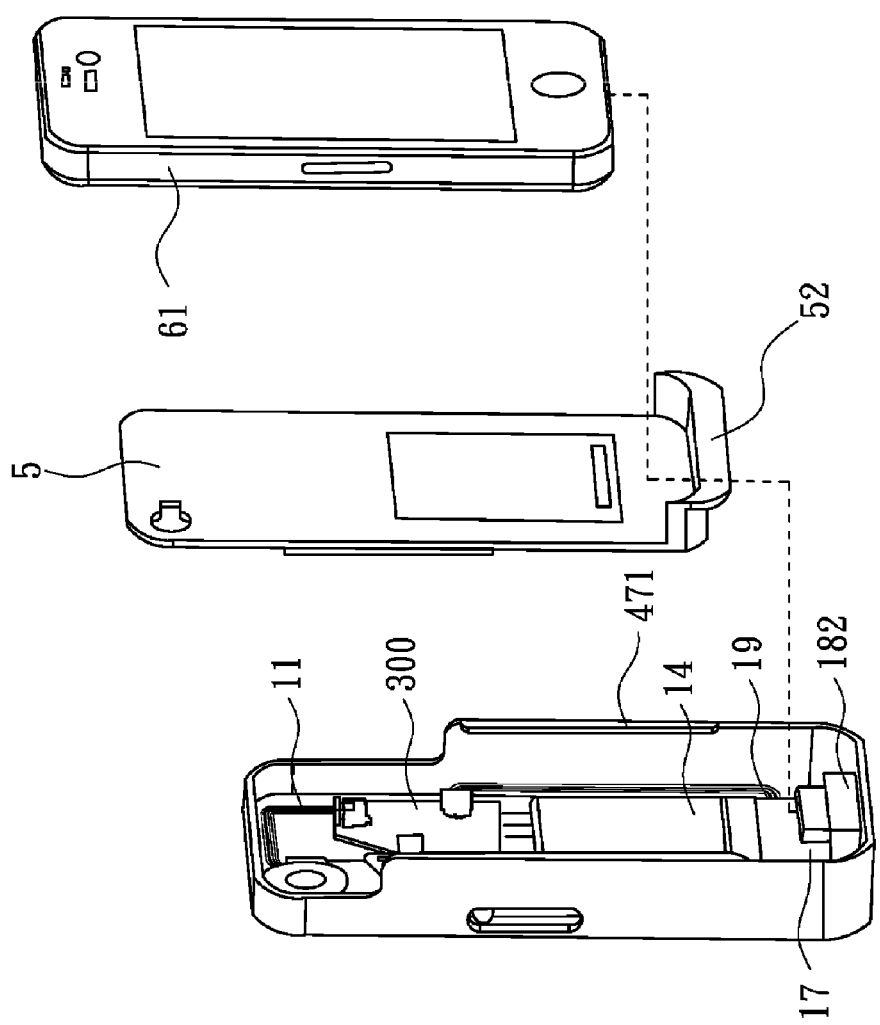
FIG. 6 is a perspective view of another embodiment of a composite module of the invention.

FIG. 6 depicts another embodiment of a composite module of the invention. A holder 52 is formed on a lower side of the upper cover 5 (see FIG. 6). An USB connector 182 which is different from the USB connector 181 protrudes inwards. The mobile phone 61 is held by the holder 52 and connected to the USB connector 182. The external cable 15 is not necessary. The lithium battery 14 is able to provide power for the mobile phone 61 through the first circuit board 300, the cable 19, the third circuit board 17 and the USB connector 182.

Figure 7:
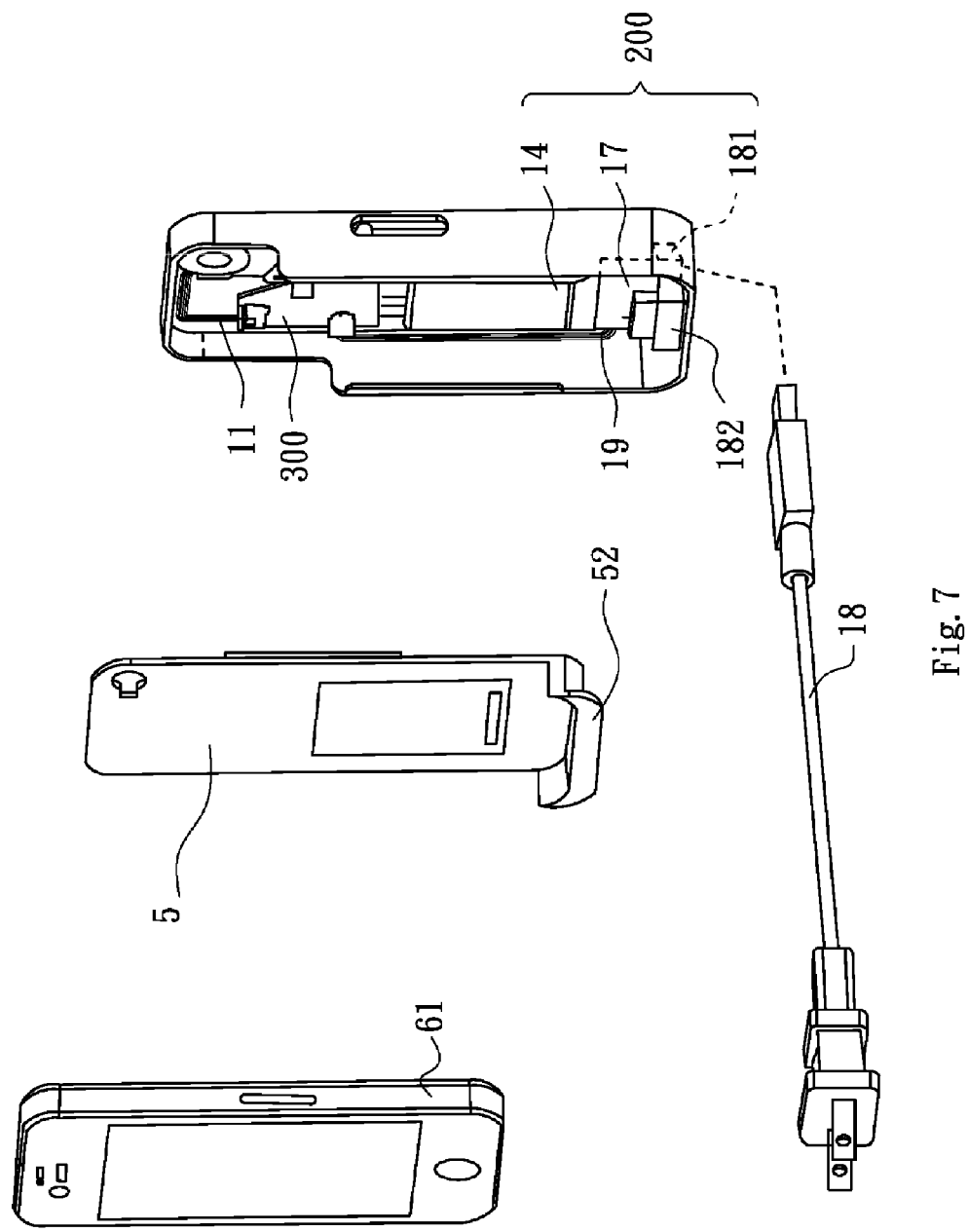
FIG. 7 is a perspective view of another embodiment of a composite module of the invention.

FIG. 7 depicts another embodiment of a composite module of the invention. USB connectors 181 and 182 are disposed on the third circuit board 17. The USB connector 181 connects a power cable (second cable) 18. The power cable 18 is connected to an external power supply. In addition to the first control chip, a second control chip (not shown) is also disposed in the third circuit board 17. When the voltage of the lithium battery 14 is lower than a predetermined value, the second control chip is switched on, and the external power supply is able to charge the lithium battery 4 through the power cable 18, the USB connector 181, the third circuit board 17, the cable 19 and the first circuit board 300. When the voltage of the lithium battery 14 is larger than the predetermined value, the second control chip is switched off to avoid overcharging the lithium battery 4.

From the above descriptions, it is understood that the mobile phone cover of the invention including the macro focus module 100 for macro shots and the power supply module 200 for mobile power supply has more functions than before.

What is claimed is:

1. A composite module for a mobile phone comprising a first lens, comprising:
    a macro focus module comprising a second lens, a light source near the second lens, a cover, a sliding member, and a torsion spring connecting the cover and the sliding member, wherein the second lens is movable, the light source illuminates in response to the second lens moving to a predetermined location in front of the first lens, the light source extinguishes in response to the second lens leaving the predetermined location, the sliding member is configured to drive the cover to rotate with respect to a shaft through the torsion spring, the cover rotates to move the second lens to the predetermined location in response to the sliding member sliding to a first position, and the cover rotates to move the second lens away from the predetermined location in response to the sliding member sliding to a second position;
    a power supply module comprising a power supply and a connection interface; and
    a first circuit board coupled to the power supply, the light source, and the connection interface, wherein the power supply is configured to provide power for the light source, and further provide power for the mobile phone in response to the connection interface being connected to the mobile phone;
    wherein the sliding member comprises a protrusion configured to push a switch of the first circuit board.

2. The composite module as claimed in claim 1, wherein the second lens is fixed to the cover, and the sliding member is movable between the first position and the second position.

3. The composite module as claimed in claim 2, wherein the macro focus module further comprises a second circuit board fixed to the cover and coupled to the first circuit board, and the light source is disposed on the second circuit board.

4. The composite module as claimed in claim 1, wherein in response to the sliding member sliding to the first position, the protrusion pushes the switch of the first circuit board so that the power supply provides power for the light source.

5. The composite module as claimed in claim 2, further comprising an upper cover and a lower cover, wherein the macro focus module, the power supply module and the first circuit board are disposed on the lower cover, and the upper cover covers the macro focus module, the power supply module and the first circuit board.

6. The composite module as claimed in claim 5, wherein the lower cover has two opposite lateral sides, a slot opening is formed on one of the lateral sides, the sliding member comprises a boss extending through the slot opening, the sliding member is moved by pushing the boss, and each of the lateral sides has a clamping arm holding the mobile phone on the upper cover.

7. The composite module as claimed in claim 1, wherein the power supply module further comprises:
- a third circuit board coupled to the first circuit board, wherein the connection interface is disposed on the third circuit board; and
- a first control chip disposed on the third circuit board, wherein the first control chip is switched on for the power supply to provide the mobile phone with power in response to the power supply having a voltage higher than the mobile phone, and the first control chip is switched off in response to the power supply having a voltage lower than the mobile phone.

8. The composite module as claimed in claim 7, wherein the power supply module further comprises a first cable connecting the connection interface and the mobile phone.

9. The composite module as claimed in claim 7, wherein the connection interface comprises a connector by which the mobile phone is connected to the connection interface.

10. The composite module as claimed in claim 7, wherein the power supply module further comprises a second control chip, the second control chip is switched on to allow an external power supply to charge the power supply in response to the voltage of the power supply being lower than a predetermined value, and the second control chip is switched off in response to the voltage of the power supply being higher than the predetermined value.

11. The composite module as claimed in claim 10, wherein the power supply module further comprises a second cable connecting the connection interface and the external power supply.

12. The composite module as claimed in claim 1, wherein the power supply is a lithium battery.

13. The composite module as claimed in claim 1, wherein the light source is a light emitting diode.

14. The composite module as claimed in claim 1, wherein the connection interface is a universal serial bus (USB).

15. A composite module for a mobile phone comprising a first lens, comprising:
- a macro focus module comprising a cover, a second lens, a light source near the second lens, a sliding member, and a torsion spring connecting the cover and the sliding member, wherein the second lens is movable, the light source illuminates in response to the second lenses moving to a predetermined location in front of the first lens, the light source extinguishes in response to the second lens leaving the predetermined location in front of the first lens, the sliding member is configured to drive the cover to rotate with respect to a shaft through the torsion spring, the cover rotates to move the second lens to the predetermined location in response to the sliding member sliding to a first position, and the cover rotates to move the second lens away from the predetermined location in response to the sliding member sliding to a second position;
- a power supply module comprising a power supply; and
- a first circuit board coupled to the power supply and the light source, wherein the power supply is configured to provide power for the light source;
- wherein the sliding member comprises a protrusion configured to push a switch of the first circuit board.

16. The composite module as claimed in claim 15, wherein the second lens is fixed to the cover, and the sliding member is movable between the first position and the second position.

17. The composite module as claimed in claim 15, wherein after the time that the sliding member slides to the first position, the protrusion pushes the switch of the first circuit board so that the power supply provides power for the light source.

18. The composite module as claimed in claim 16, further comprising an upper cover and a lower cover, wherein the macro focus module, the power supply module and the first circuit board are disposed on the lower cover, and the upper cover covers the macro focus module, the power supply module and the first circuit board.

19. The composite module as claimed in claim 18, wherein the lower cover has two opposite lateral sides, a slot opening is formed on one of the lateral sides, the sliding member comprises a boss extending through the slot opening, the sliding member is moved by pushing the boss, and each of the lateral sides has a clamping arm holding the mobile phone on the upper cover.

20. A composite module for a mobile phone comprising a first lens, the composite module comprising:
- a macro focus module comprising a light source and a power supply configured to provide power for the light source, a second lens, a cover, a sliding member comprising a protrusion, and a torsion spring connecting the cover and the sliding member, wherein the second lens is movable, in response to the second lenses moving to a predetermined location in front of the first lens, the light source illuminates, in response to the second lens leaving the predetermined location in front of the first lens, the light source extinguishes, the sliding member is configured to drive the cover to rotate with respect to a shaft through the torsion spring, the cover rotates to move the second lens to the predetermined location in response to the sliding member sliding to a first position, and the cover rotates to move the second lens away from the predetermined location in response to the sliding member sliding to a second position;
- wherein the protrusion of the sliding member is configured to push a switch of a first circuit board of the composite module.

* * * * *